J. L. CREVELING.
ELECTRIC REGULATION.
APPLICATION FILED SEPT. 29, 1911. RENEWED OCT. 30, 1918.
1,306,174.
Patented June 10, 1919.
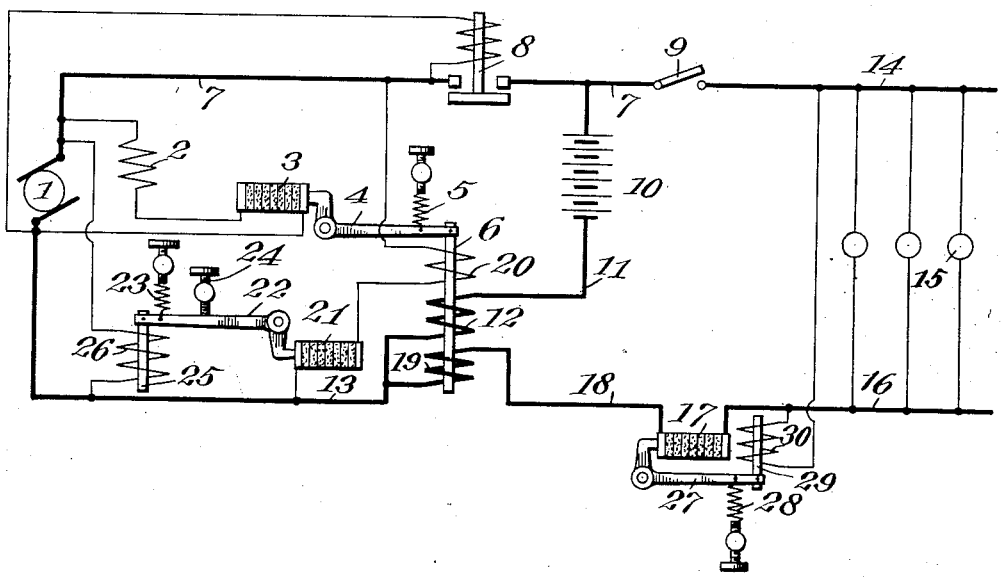
WITNESSES
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,306,174.

Specification of Letters Patent.

Patented June 10, 1919.

Application filed September 29, 1911, Serial 651,896. Renewed October 30, 1918. Serial No. 260,375.

*To all whom it may concern:*

Be it known that I, JOHN L. CREVELING, a resident of New York, in the county and State of New York, have invented certain new and useful Improvements in Electric Regulations, as set forth in the annexed specification and drawing, forming a part thereof.

My invention pertains to that class of electric regulation wherein it is desired to regulate a dynamo or generator in a predetermined manner and has for its particular object to provide means for automatically thus regulating a dynamo.

As my invention is particularly applicable to systems of electric distribution wherein a dynamo is used to charge a storage battery and furnish current to lamps or other translating devices, it will be described in connection with such a system.

The drawing is a diagrammatic representation of one type of system embodying the essentials of my invention.

In the drawing, 1 represents a dynamo or generator provided with the usual field coil 2, having in series therewith resistance 3 indicated as of the carbon pile variety, and it will be obvious that the dynamo may be regulated by proper manipulation of said resistance. This resistance 3 is controlled by the lever 4 normally drawn in an upward direction as by adjustable spring 5, in such manner as to tend to compress the carbon pile 3 and lower the resistance thereof. The lever 4 carries at one extremity a core of magnetic material 6 and thus motion imparted to said core may serve to regulate the generator. 7 represents the positive lead of the generator which is carried to one side of the switch 8 which is preferably of the automatic variety adapted to close the circuit when the voltage of the generator is substantially that of the battery, and as many such switches are known in the art and the particular type of switch forms no part of my present invention, one of the well known types is merely indicated diagrammatically. From the switch 8 the lead 7 continues to one side of the switch 9 and is connected with the positive side of the storage battery 10, the negative side of which is connected as by wire 11 with one end of the solenoid coil 12 surrounding the core 6 and having its other terminal connected as by lead 13 to the negative brush of the generator. From the switch 9 the main 14 is carried to one side of the lamps or other translating devices 15 having their negative terminals connected with the main 16 which is carried to one side of a translation circuit regulator, in this instance indicated as a carbon pile 17, having its opposite terminal connected as by wire 18 with the solenoid coil 19, the opposite end of which is in connection with the lead 13. The coils 12 and 19 are so wound that if either be alone energized the same will tend to draw the core 6 downwardly against the action of spring 5 and increase the resistance 3, and so wound that current passing through the coil 12 when the battery is being charged will set up a magneto-motive force in the same direction to that set up by the coil 19 when the current is passing through said coil 19 from the lamps or translating devices to the battery. 20 is a solenoid coil in shunt across the generator circuit surrounding the core 6 in such manner that, when energized, it tends to draw the core 6 downwardly and increase the resistance 3. The carbon pile 21 is controlled by the lever 22 normally drawn in an upward direction as by spring 23, the limit of such movement being determined by the adjustable screw 24. The lever 22 is provided at one extremity with the core 25 surrounded by a solenoid coil 26 in shunt across the generator and battery circuit. The resistance 17 is controlled by the lever 27 normally drawn in a downward direction as by spring 28. The lever 27 is provided at one extremity with a core of magnetic material 29 surrounded by the solenoid coil 30 in shunt across the translation circuit.

An operation of the herein shown system comprehending my invention is substantially as follows:—

If the dynamo be running at such speed that the electro-motive force be sufficient to charge the storage battery, the switch 8 will be closed and current will flow from the generator through lead 7, switch 8, storage battery 10, wire 11, solenoid coil 12 and lead 13 to the generator, and I so adjust the spring 5 that when the desired maximum current is flowing through the battery and coil 12, any increase above this maximum current will cause said coil 12 to draw the core 6 downwardly against the action of spring 5 and increase the resistance 3, in such manner as to hold this desired maximum charging current from being exceeded. If, now, the battery be charged at this maximum rate until its voltage has risen to the maximum voltage desired to have impressed across its terminals, I so adjust the spring 23 that upon any further increase in voltage across the solenoid coil 26 the same will cause the core 25 to be drawn downwardly against the action of spring 23 in such manner as to increase the pressure upon the carbon pile 21 and decrease the resistance thereof and by thus increasing the current in coil 20 prevent this maximum desired voltage being exceeded by the generator in a well-known manner. By use of the pilot resistance 21 operated by the coil 26, I cause considerable variations in the current in the coil 20 upon extremely slight voltage changes across the coil 26 at such times as the generator tends to exceed desired maximum voltages and, therefore, I hold the voltage across the generator from exceeding a desired amount within very narrow limits, and if the battery be charged until its voltage be substantially the maximum voltage for which spring 23 is set, the current in the coil 12 will be practically *nil* and the regulation of the generator will be substantially voltage regulation throughout speed changes. If, now, the lamp circuit be closed, as by closing the switch 9, current will flow through switch 9, main 14, translating devices 15, main 16, resistance 17, lead 18 and solenoid coil 19 to the lead 13, thence to the generator, and as the coil 19 is wound in such direction that this coil when thus traversed by current assists the action of the charging current in the solenoid coil 12 and the voltage controlled current in the coil 20, the effect of the lamp load will be to cause a lesser current to be necessary in the solenoid coil 12 or 20 or both in order to draw the core 6 downwardly against the spring 5. If the battery be receiving its full charging current at a voltage below that for which the pilot 26—21 is set there will be little, if any, current in the coil 20 and the regulation of the generator will be current regulation controlled by the charging current in the coil 12 and, the translation circuit current in the coil 19, by assisting the current in the coil 12, will cause a lesser current to be necessary in the coil 12 in order to regulate the generator throughout speed changes and, the charging rate to the battery will thus be lessened or modified in proportion to the translation circuit load, which in turn is affected by the operation of the translation circuit regulating resistance in response to voltage fluctuations across the solenoid coil 30. Thus, it will be obvious that the desired maximum charging current may be delivered to the battery when this is the total load upon the generator and that this current will be held from being exceeded by the effect of the coil 12 upon the resistance 3, and if load be thrown upon the translation circuit the output of the generator may be varied or increased in a desired proportion. That is to say, two amperes lamp load, for example, in the coil 19 may cause 1 ampere less to be required in the coil 12, and thus the generator output may be increased 50% of the lamp load and, with this proportion taken for example merely, it will be noted that if coil 19 alone were operative, the generator output could not be increased more than 100% and thus protection is afforded. If the coils 20 and 12 be operating conjointly to regulate the generator for example in such manner that the maximum voltage is held from being exceeded by the coil 26 and this maximum voltage is causing 50% of the charging rate to be delivered through coil 12, then the addition of the lamp load will, through the effect of the coil 19, lessen the current furnished to the battery through coil 12 and thus the charging current will be cut down as load is thrown on the translation circuit, which is a desirable condition if the batteries have been charged to that point that the voltage regulating means is playing an important part in the regulation of the generator, for, it is not then desired that a heavy charging current shall be supplied to the battery merely to force its voltage upward when there is a load upon the translation circuit which is held at a lower voltage, as the rise in voltage across the battery would cause considerable loss in the drop across the resistance 17 of the translation circuit regulator, which has the spring 28 so adjusted as to hold the normal voltage which may be supplied by the battery alone on the translation devices in a well known manner.

I do not wish in any way to limit myself to the exact system set forth in this application merely to illustrate one type of system comprehending the essentials of my invention, for it will be obvious that wide departure may be made without departing from the spirit and scope of my invention which is as set forth in the following claims:

1. In a system of the character described, in combination, a generator, a storage battery adapted to be charged thereby, regulating means for said generator, a current coil through which charging current passes acting on said regulating means to maintain the current therein at substantially the desired value through a substantial portion of the charge of the battery, a voltage coil adapted to act on said regulating means, and means adapted to come into action as said battery approaches full charge and adapted to multiply in said voltage coil the effect of variations in the voltage of said generator.

2. In a system of the character described, in combination, a generator, a storage battery adapted to be charged thereby, said generator being provided with a shunt field, a variable resistance medium operatively related to said shunt field, a current coil through which charging current passes provided with means acting on said variable resistance to maintain the total current in said coil at substantially the desired value through a substantial portion of the charge of said battery, a voltage coil, means adapted to multiply in said voltage coil the effect of variations in generator voltage, said last means comprising a variable resistance operatively related to said voltage coil, and means adapted to cause said last mentioned means to act upon said first variable resistance when the voltage across said generator reaches a desired maximum.

3. In a system of the character described, in combination, a generator, a storage battery adapted to be charged thereby, regulating means for said generator, a current coil through which charging current passes acting on said regulating means to maintain the current therein at substantially the desired value through a substantial portion of the charge of the battery, a voltage coil adapted to act on said regulating means, and means adapted to come into action as said battery approaches full charge and adapted to multiply in said voltage coil the effect of variations in the voltage of said generator, said voltage coil and said current coil being continuously in operative relation to said regulating means.

4. In a system of the character described, in combination, a generator, a storage battery adapted to be charged thereby, a pressure-controlled variable resistance medium connected in the shunt field of said generator, a current coil through which charging current passes acting on said variable resistance to maintain the total current in said coil at substantially the desired value, a voltage coil adapted to act upon said variable resistance, and means comprising a second variable resistance operatively related to said voltage coil adapted at the desired maximum voltage of said generator to come into action and multiply in said voltage coil the effect of variations in voltage of said generator.

JOHN L. CREVELING.

Witnesses:
ANNA M. WALL,
M. HERSKOVITZ.